US012793445B2

(12) United States Patent
Onita et al.

(10) Patent No.: US 12,793,445 B2
(45) Date of Patent: Nov. 10, 2026

(54) FORM PROCESSING SYSTEM, FORM PROCESSING METHOD, AND RECORDING MEDIUM

(71) Applicant: NEC Corporation, Tokyo (JP)

(72) Inventors: Akihiko Onita, Tokyo (JP); Ryo Nakagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 6 days.

(21) Appl. No.: 18/729,715

(22) PCT Filed: Feb. 21, 2022

(86) PCT No.: PCT/JP2022/006881

§ 371 (c)(1),
(2) Date: Jul. 17, 2024

(87) PCT Pub. No.: WO2023/157282

PCT Pub. Date: Aug. 24, 2023

(65) Prior Publication Data

US 2025/0086988 A1 Mar. 13, 2025

(51) Int. Cl.

*G06V 20/60* (2022.01)
*B07C 5/342* (2006.01)
*B07C 5/36* (2006.01)
*B25J 9/16* (2006.01)
*G06V 30/412* (2022.01)

(52) U.S. Cl.

CPC ............ *G06V 20/60* (2022.01); *B07C 5/3422* (2013.01); *B07C 5/362* (2013.01); *B25J 9/1697* (2013.01); *B07C 2501/0063* (2013.01); *G06V 30/412* (2022.01); *G06V 2201/06* (2022.01)

(58) Field of Classification Search

CPC ....... B07C 5/3422; B07C 5/362; B07C 5/342; B07C 5/36; B07C 2501/0063; B25J 9/1697; G06V 20/60; G06V 30/412; G06V 2201/06; B65H 3/08; B65H 7/12

See application file for complete search history.

(56) References Cited

U.S. PATENT DOCUMENTS

2021/0227085 A1 * 7/2021 Fielding ................. H04N 1/125

FOREIGN PATENT DOCUMENTS

| | | | | |
|---|---|---|---|---|
| JP | H08-2712 | A | | 1/1996 |
| JP | 2000-103545 | A | | 4/2000 |
| JP | 2000-118750 | A | | 4/2000 |
| JP | 2006-143369 | A | | 6/2006 |
| JP | 2014-009040 | A | | 1/2014 |
| JP | 2017039567 | A | * | 2/2017 |

(Continued)

OTHER PUBLICATIONS

International Search Report for PCT Application No. PCT/JP2022/006881, mailed on May 10, 2022.

(Continued)

*Primary Examiner* — Nhi Q Bui

(74) *Attorney, Agent, or Firm* — Sughrue Mion, PLLC

(57) ABSTRACT

A form processing system according to an aspect of the present disclosure includes at least one memory configured to store instructions; and at least one processor configured to execute the instructions to: acquire an image of a form lifted by a robot, the image being captured from a direction intersecting a lifting direction; and determine whether the lifted form is bundled based on the image.

14 Claims, 10 Drawing Sheets

(56) References Cited

FOREIGN PATENT DOCUMENTS

| | | | | | |
|---|---|---|---|---|---|
| JP | 2020-037157 | A | | 3/2020 | |
| JP | 2020131306 | A | * | 8/2020 | .............. B25J 13/08 |
| JP | 2021-005792 | A | | 1/2021 | |
| RU | 2745482 | C1 | * | 3/2021 | ............... G07D 3/00 |

OTHER PUBLICATIONS

English translation of Written opinion for PCT Application No. PCT/JP2022/006881, mailed on May 10, 2022.

* cited by examiner

FORM PROCESSING SYSTEM, FORM PROCESSING METHOD, AND RECORDING MEDIUM

This application is a National Stage Entry of PCT/JP2022/006881 filed on Feb. 21, 2022, the contents of all of which are incorporated herein by reference, in their entirety.

TECHNICAL FIELD

The present disclosure relates to a form processing system and the like.

BACKGROUND ART

It is common to process a form using a machine. For example, a roller is used to convey a form. A robot lifts a placed form and moves the form. For example, PTL 1 discloses an articulated robot that grips uppermost paper sheets stacked in one place and carries the uppermost paper sheets out to another place.

CITATION LIST

Patent Literature

PTL 1: JP 2020-037157 A

SUMMARY OF INVENTION

Technical Problem

A plurality of forms may be retained using a stapler to form a bundle. For example, a plurality of forms may be stuck together by static electricity to form a bundle. A bundle of forms may interfere with subsequent processing.

An object of the present disclosure is to provide a form processing system and the like that can appropriately process a bundle of forms.

Solution to Problem

A form processing system according to the present disclosure includes an acquisition means for acquiring an image of a form lifted by a robot, the image being captured from a direction intersecting a lifting direction, and a determination means for determining whether the lifted form is bundled based on the image.

A form processing method according to the present disclosure includes acquiring an image of a form lifted by a robot, the image being captured from a direction intersecting a lifting direction, and determining whether a lifted form is bundled based on the image.

A program according to the present disclosure causes a computer to execute acquiring an image of a form lifted by a robot, the image being captured from a direction intersecting a lifting direction, and determining whether a lifted form is bundled based on the image. The program may be stored in a non-transitory, computer-readable recording medium.

Advantageous Effects of Invention

According to the present disclosure, it is possible to appropriately process a bundle of forms.

EXAMPLE EMBODIMENT

Example embodiments of a form processing system, a form processing method, a program, and a recording medium that non-transiently records the program according to the present disclosure will be described below with reference to the drawings. The form includes, for example, a substitute storage sheet, a slip, a gift certificate, or a receipt, but is not limited thereto, and may include other documents. The present disclosure is also applicable to processing of sheets other than forms. The processable sheet is, for example, a sheet-like thin metal, a plastic clear file, a flyer, or a magazine.

First Example Embodiment

Figure 1:
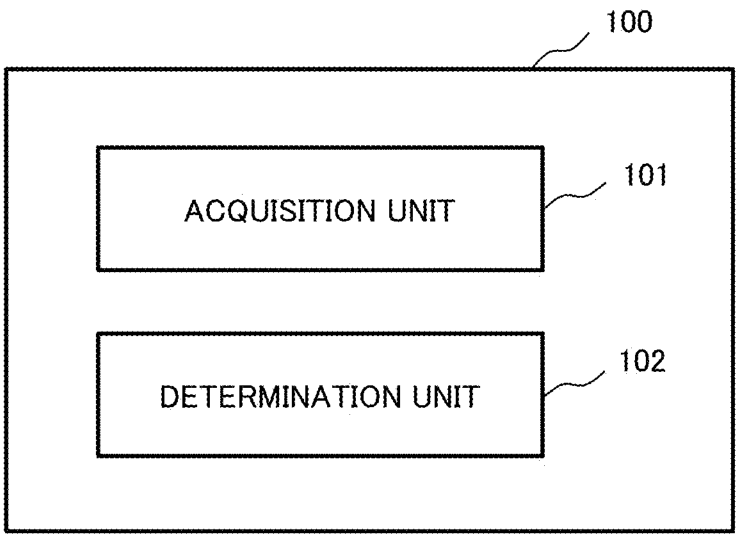
FIG. 1 is a block diagram illustrating a configuration example of a form processing system 100 according to a first example embodiment.

A form processing system 100 according to a first example embodiment is a system that determines whether a form lifted by a robot is bundled. FIG. 1 is a block diagram illustrating a configuration example of the form processing system 100 according to the first example embodiment. The form processing system 100 includes an acquisition unit 101 and a determination unit 102.

The acquisition unit 101 acquires an image obtained by capturing a form lifted by the robot from a direction intersecting with the lifting direction. The acquisition unit 101 may acquire information of other sensors that have measured the state of a form being lifted by the robot.

The robot holds and lifts a form. The robot may lift the uppermost form from a place where a plurality of forms are stacked. The robot may hold the form by attracting the form to a flat plate or a plurality of contacts provided in a robot arm by static electricity or air suction or discharge. Alternatively, the robot may hold a form by gripping sides of the form.

The determination unit 102 determines whether the lifted form is bundled based on the image acquired by the acquisition unit 101. A bundle indicates a state in which some of the layers of a plurality of forms are not separated and are continuous.

The case where the form is bundled includes, for example, a case where the form is fastened by a fastener. The fasteners include, for example, staples, clips, tapes, and files. The case where the forms are bundled includes a case where the forms are glued or difficult to separate from each other due to static electricity. Further, the case where form is bundled may include a case where one or more forms are folded. In other words, "not bundled" is a state in which a sheet such as one form is flat.

The determination unit 102 determines whether a form is bundled using an arbitrary image recognition method. The determination unit 102 may determine whether a form is bundled by recognizing the form being hanged based on an image. For example, in a case where a robot holds a form by adsorbing, the robot adsorbs only the uppermost form among the bundled forms, and thus the other forms are suspended. In a case where the acquisition unit 101 acquires information of other sensors that have measured the state of the form being lifted by the robot, the determination unit 102 may determine whether the form is bundled based on these pieces of information.

Figure 2:
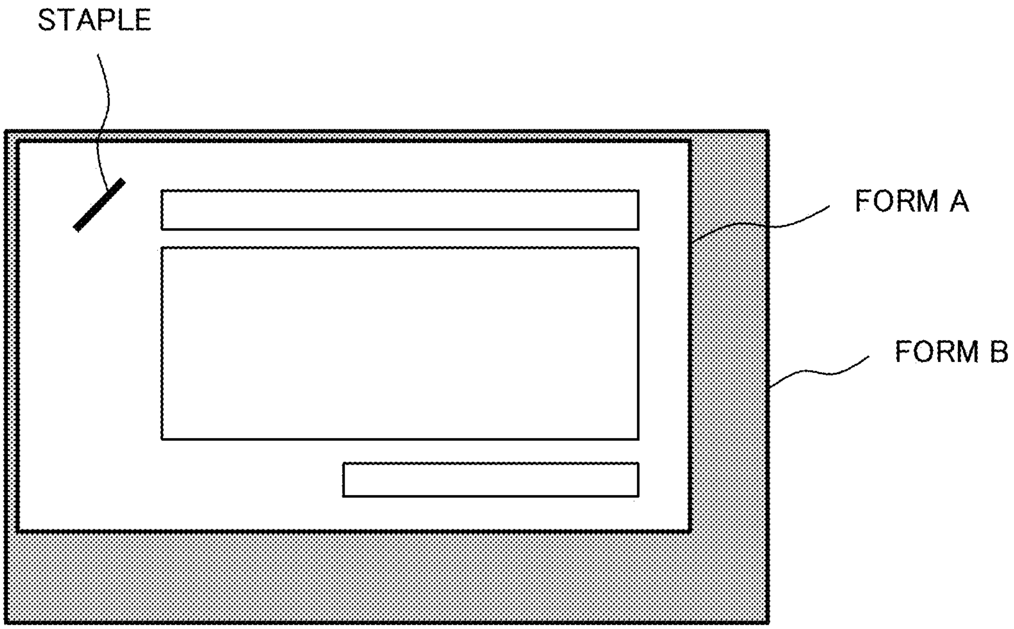
FIG. 2 is a diagram illustrating an example of a bundled form.

FIG. 2 is a diagram illustrating an example of a bundled form. In FIG. 2, forms A and B are bundled by staples.

Here, a case where a form is sucked and lifted by a suction plate of a robot will be described as an example. The form bundled as illustrated in FIG. 2 is lifted by a robot from a state in which form A is placed flat on the upper side and form B is placed flat on the lower side, for example.

Figure 3:
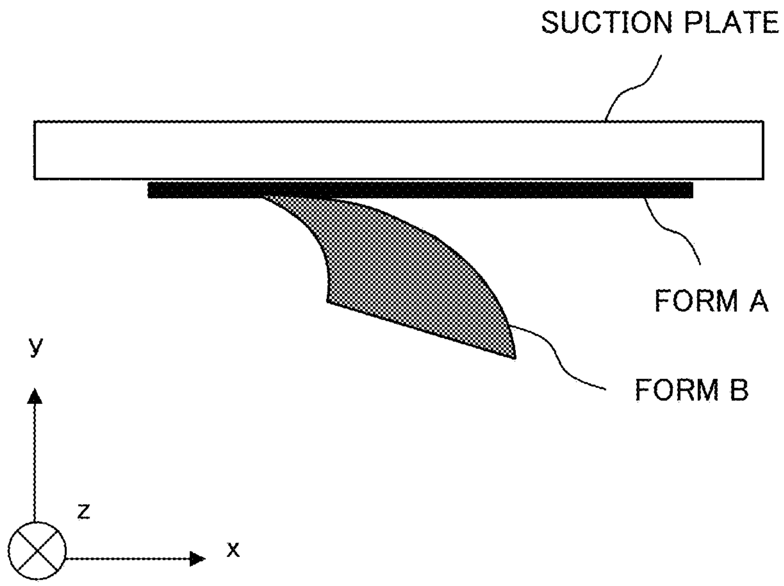
FIG. 3 is a diagram illustrating a situation in which a lifted form is viewed from the side.

FIG. 3 is a diagram illustrating a situation in which a lifted form is viewed from the side. In FIG. 3, for example, the x-axis direction is a horizontal direction which is a direction along the ground surface, and the y-axis direction is a direction opposite to the gravity direction. That is, FIG. 3 illustrates a situation where a form placed on a plane along the horizontal direction is lifted in the vertical direction as it is.

As an example, the acquisition unit 101 may acquire an image captured from the z-axis direction illustrated in FIG. 3. When recognizing the form B being hanged based on the image, the determination unit 102 determines that a form is bundled. The acquisition unit 101 may acquire an image captured from a direction intersecting the y-axis direction illustrated in FIG. 3.

In FIG. 3, a situation where the placed form is lifted in the vertical direction as it is has been described, but the lifted form may be erected perpendicularly to the ground surface. The acquisition unit 101 may acquire an image obtained by photographing a vertically erected form from a direction intersecting the lifting direction. For example, in FIG. 3, the acquisition unit 101 may acquire an image in which the y-axis direction is a horizontal direction which is a direction along the ground surface and the x-axis direction is a direction opposite to the gravity direction.

Figure 4:
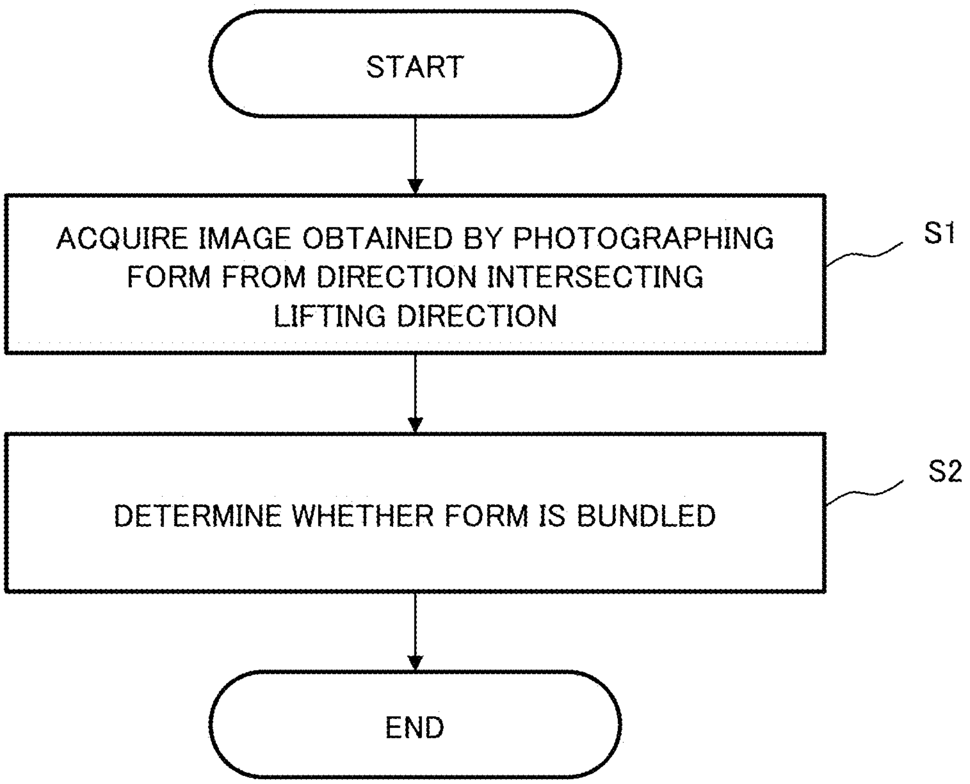
FIG. 4 is a flowchart illustrating an operation example of the form processing system 100 according to the first example embodiment.

FIG. 4 is a flowchart illustrating an operation example of the form processing system 100 according to the first example embodiment.

First, the acquisition unit 101 acquires an image obtained by photographing a form lifted by the robot from a direction intersecting the lifting direction (step S1). The acquisition unit 101 transmits the acquired image to the determination unit 102. Then, the determination unit 102 determines whether the lifted image is in a bundle based on the image (step S2).

According to the first example embodiment, it is determined whether the form lifted by the robot is bundled based on an image captured from a direction intersecting the lifting direction. Therefore, it is possible to appropriately process a bundle of forms.

In some cases, it is difficult to determine whether a form is bundled from an image obtained by photographing a paper surface of the form in a state where the form is placed. According to the first example embodiment, it is determined whether a form is bundled based on an image obtained by photographing a lifted form from a direction intersecting a lifting direction, so that it is possible to appropriately process the bundled form.

In a case where it is recognized that forms are stapled by image recognition, it may be difficult to detect the presence or absence of staples depending on the color or shape of the staples. For example, in a case where non-metallic staples are used, the colors of the staples and the form may be similar, or characters written on the paper surface of the form and staples may overlap each other. In these cases, it is difficult to recognize staples from an image obtained by photographing a paper surface of a form. According to the first example embodiment, even in a case where it is difficult to recognize staples, it is possible to determine a bundle of forms.

The first example embodiment is also applicable to a system other than a form processing system using a robot. For example, the form processing system 100 may be a determination system that determines whether a form lifted by a person is bundled.

Second Example Embodiment

Figure 5:
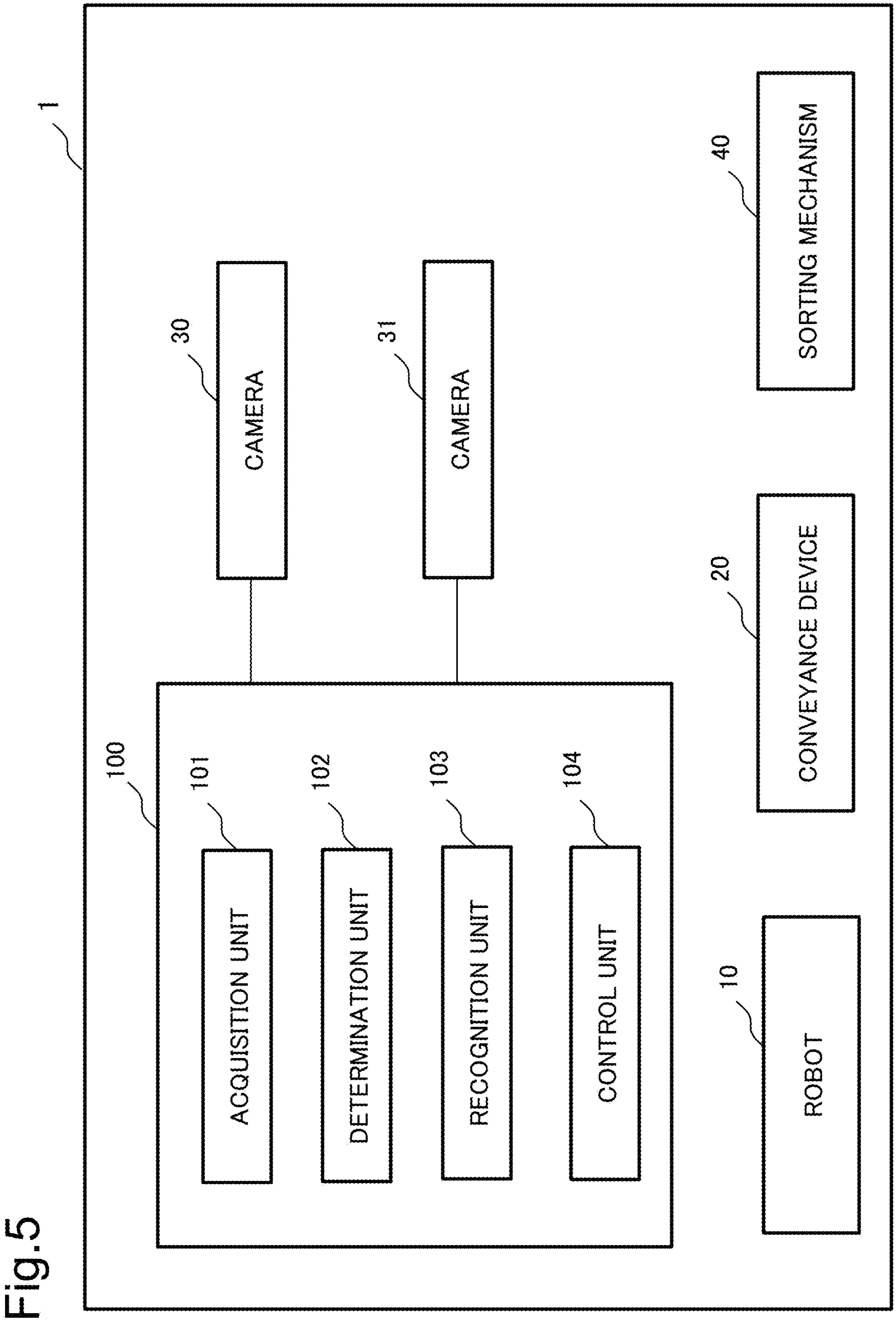
FIG. 5 is a block diagram illustrating a configuration example of a form sorting system 1 according to a second example embodiment.

Next, as a second example embodiment, another example of the form processing system 100 will be described. In the second example embodiment, a form processing system 100 is included in a form sorting system 1. FIG. 5 is a block diagram illustrating a configuration example of a form sorting system 1 according to the second example embodiment. In the configuration of the form processing system 100 according to the second example embodiment, description of the same configuration as the configuration according to the first example embodiment will be omitted.

The form sorting system 1 according to the second example embodiment includes a robot 10, a conveyance device 20, a camera 30, a camera 31, and a sorting mechanism 40. The form processing system 100 according to the second example embodiment includes an acquisition unit 101, a determination unit 102, a recognition unit 103, and a control unit 104.

The robot 10 operates in accordance with control by the control unit 104. For example, the robot 10 lifts a placed form and proceeds to sorting processing. For example, the robot 10 places a form on the conveyance device 20 in order to advance the form to sorting processing. In a case where it is determined that the form is bundled, the robot 10 stops the operation of proceeding to the sorting processing.

The conveyance device 20 conveys a form to the sorting mechanism 40. The conveyance device 20 is, for example, a roller conveyor that conveys a form by rotating each of rollers disposed in parallel. The conveyance device 20 may include a conveyor belt.

The camera 30 causes the robot 10 to capture an image of a form being lifted from a direction intersecting a lifting direction.

The camera 31 photographs a placed form. The camera 31 may photograph a place where a plurality of forms are placed in an overlapping manner.

In the present example embodiment, an example in which the camera 30 and the camera 31 are achieved by separate cameras is illustrated. However, the camera 30 and the camera 31 may be achieved by a single camera.

The sorting mechanism 40 sorts forms into a plurality of sorting destinations according to types by an existing sorting technique. Types of forms to be sorted into sorting destinations are set in advance by an administrator or the like.

The sorting mechanism 40 sorts the forms into sorting destinations according to the type (content or size) of the form. For example, the sorting mechanism 40 may sort forms according to the size of a paper sheet. The forms may be sorted according to contents such as substitute storage sheet, a slip, a gift certificate, a receipt, and other documents. Forms may be sorted by subsequent processing steps such as whether the forms are data input targets, whether the forms are storage targets, and whether the forms are return targets to a store. The forms may be further sorted by form name. In a case where the form is a gift certificate, the gift certificates may be further sorted according to whether they are cashing targets. A plurality of different types of forms may be sorted to the same sorting destination.

The recognition unit 103 recognizes a placed form. The recognition unit 103 may acquire an image captured by the camera 31 and recognize a placed form based on the image. Alternatively, the recognition unit 103 may receive a result of recognition of a form by the camera 31.

The recognition unit 103 may recognize the presence or absence of a form. The recognition unit 103 may recognize, for example, a side or a corner of a form, and recognizes a position and a size of the form. The recognition unit 103 may recognize a position and a size of a form by recognizing a position of a character or a code printed in the form.

The recognition unit 103 recognizes an uppermost form in which there is no overlapping form among a plurality of forms stacked in an overlapping manner. The recognition unit 103 recognizes a form in which sides of the form, printed characters, or codes are not hidden by other forms.

The recognition unit 103 may determine whether a form is bundled by recognizing whether a fastener is retained in a form based on an image obtained by photographing a placed form. For example, the recognition unit 103 may recognize staples based on an image captured by the camera 31.

The acquisition unit 101 acquires an image captured by the camera 30. Then, the determination unit 102 determines whether the form is bundled based on the image acquired by the acquisition unit 101.

The control unit 104 controls an operation in which the robot 10 lifts a form based on a recognition result by the recognition unit 103. The control unit 104 controls the position of the robot arm according to the position and size of the form. The control unit 104 controls a position where a form is sucked by a flat plate provided in the robot arm. The control unit 104 controls an operation in which the robot 10 advances forms to sorting processing. In order to advance forms to sorting processing, the control unit 104 controls the robot 10 to lift and place the form on the conveyance device 20.

In a case where it is determined that a form is bundled based on the determination result by the determination unit 102, the control unit 104 controls the robot 10 to stop the operation of advancing the form to the sorting processing.

In a case where it is determined that a form is bundled, the control unit 104 may control the robot 10 so as to place the bundled forms in an error form storage. When the form is placed in the error form storage, the robot 10 can lift the next form placed under the form.

The camera 31 and the recognition unit 103 may be provided as necessary. For example, in a case where a form having a prescribed size is placed at a prescribed position and the form is lifted without the camera 31 and the recognition unit 103, the camera 31 and the recognition unit 103 may not be provided.

The form sorting system 1 according to the second example embodiment is, for example, a system that sorts forms collected from a convenience store, but forms to be sorted may be other forms, and is not particularly limited.

Figure 6:
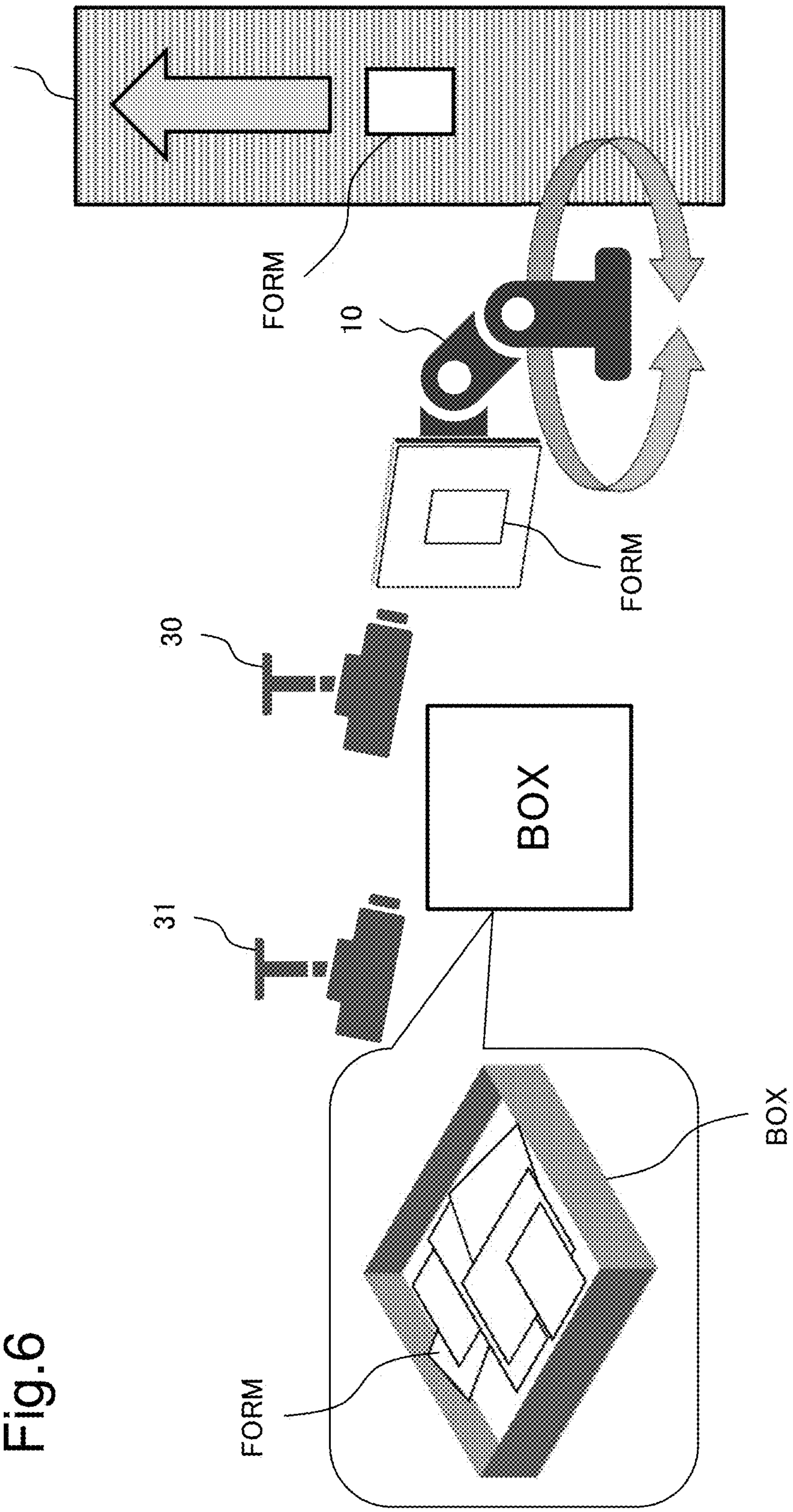
FIG. 6 is a diagram illustrating an arrangement example of a robot 10, a conveyance device 20, a camera 30, and a camera 31.

FIG. 6 is a diagram illustrating an arrangement example of the robot 10, the conveyance device 20, the camera 30, and the camera 31. In the example of FIG. 6, forms are stacked in a box. Forms collected from convenience stores are collected and transported for each store. The transported forms are placed, for example, in a box for sorting processing. The forms may be placed in different boxes for each store.

When a form is placed in a box and the box is disposed at a predetermined position for sorting processing, the camera 31 photographs the form in the box. The robot 10 takes out a form from the box and places the form on the conveyance device 20. The camera 30 captures an image of a form lifted by the robot 10 from a direction intersecting the lifting direction. The conveyance device 20 is determined not to form a bundle based on an image captured by the camera 30, and conveys the form placed by the robot 10 to the sorting mechanism 40.

Figure 7:
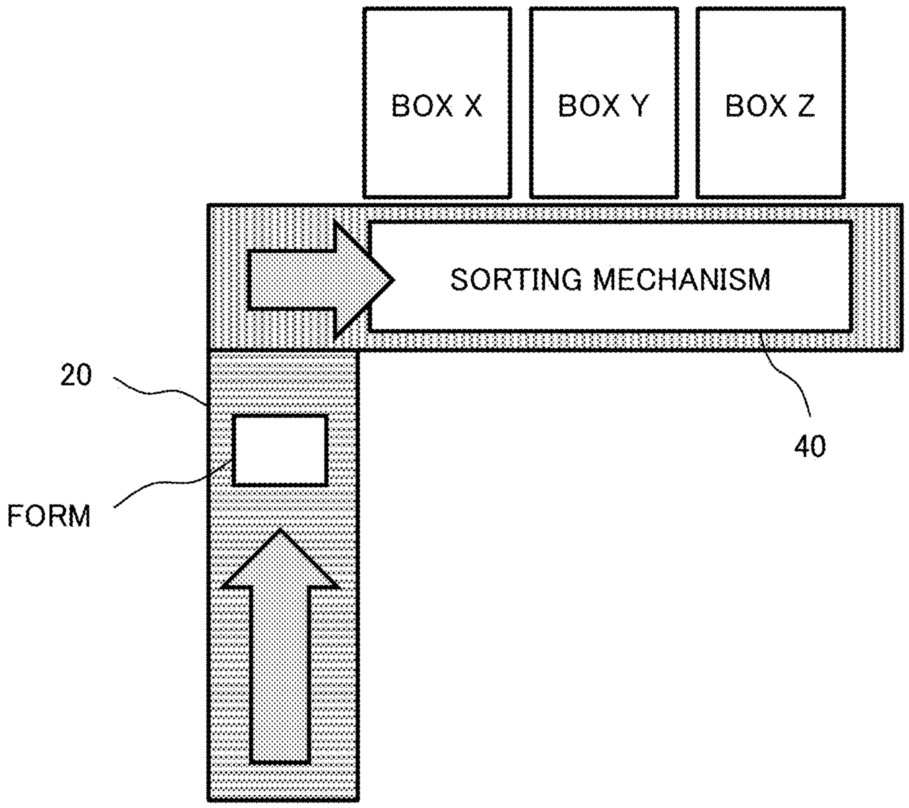
FIG. 7 is a diagram illustrating an arrangement example of a conveyance device 20 and a sorting mechanism 40.

FIG. 7 is a diagram illustrating an arrangement example of the conveyance device 20 and the sorting mechanism 40. The sorting mechanism 40 sorts a form into sorting destinations (Box X, Box Y, and Box Z) for each type of form.

Figure 8:
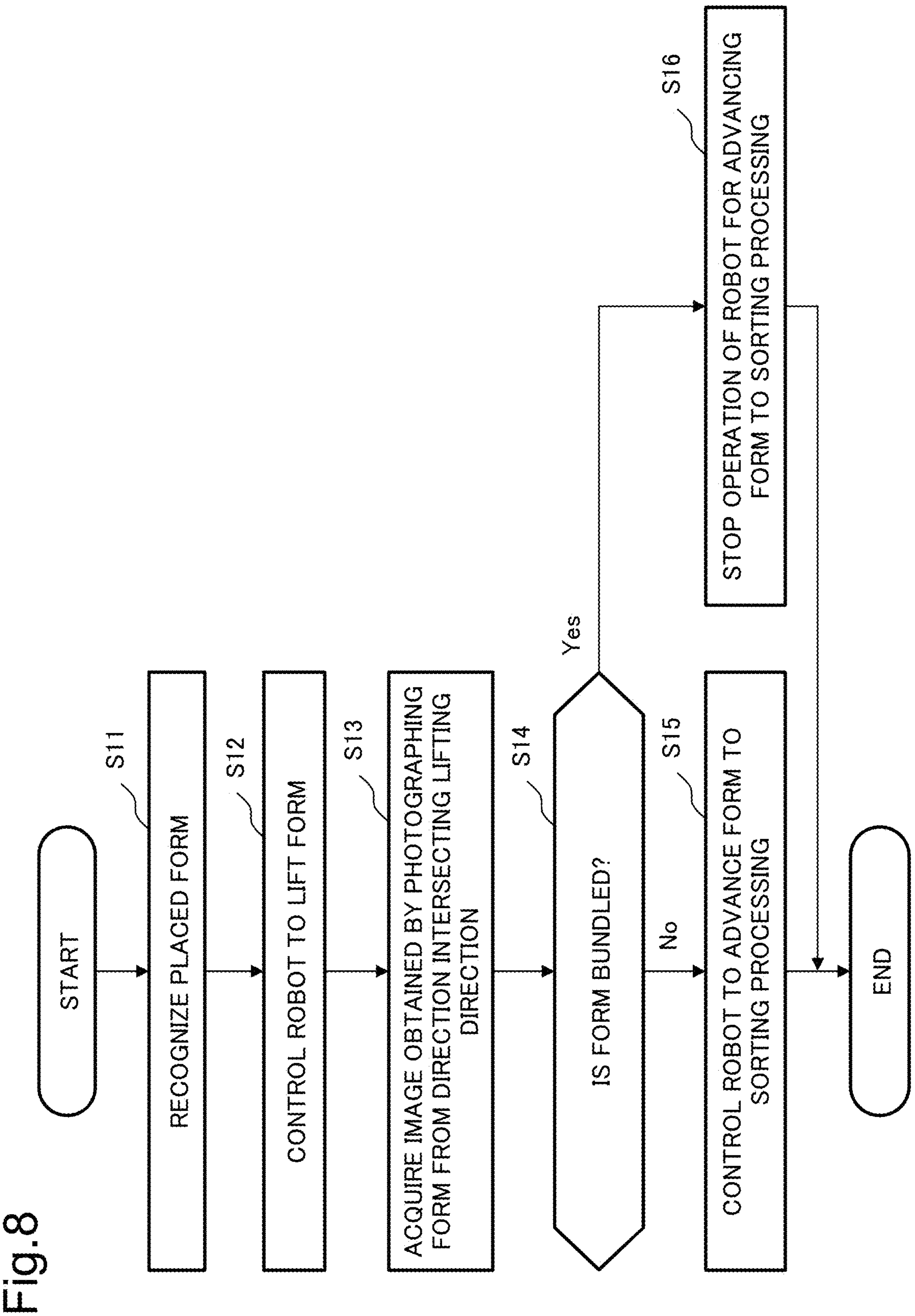
FIG. 8 is a flowchart illustrating an operation example of the form processing system 100 according to the second example embodiment.

FIG. 8 is a flowchart illustrating an operation example of the form processing system 100 according to the second example embodiment. First, the recognition unit 103 recognizes a placed form (step S11). The recognition unit 103 transmits the recognition result to the control unit 104.

The control unit 104 controls the robot 10 based on the recognition result such that the robot 10 lifts a placed form (step S12).

The acquisition unit 101 acquires an image obtained by photographing a form lifted by the robot 10 from a direction intersecting the lifting direction (step S13). The acquisition unit 101 transmits the acquired image to the determination unit 102.

The determination unit 102 determines whether the lifted form is bundled based on the image (step S14). The determination unit 102 transmits the determination result to the control unit 104.

In a case where it is determined that a form is not bundled (step S14: No), the control unit 104 controls the robot 10 to advance the form to sorting processing (step S15). In a case where it is determined that a form is bundled (step S14: Yes), the control unit 104 controls the robot 10 so that the robot 10 stops the operation of advancing the form to the sorting processing (step S16).

A bundle of forms may not be properly sorted depending on the machine. A bundle of forms may be separated and then sorted. According to the second example embodiment, when the robot 10 advances forms to sorting processing, the determination unit 102 determines whether a form is bundled. In a case where it is determined that a form is bundled, the control unit 104 controls the robot 10 so that the robot 10 stops the operation of advancing the form to the sorting processing. Therefore, it is possible to perform appropriate processing on a bundle of forms.

In the second example embodiment, a case where the form sorting system 1 includes the conveyance device 20 and the sorting mechanism 40 has been described. However, the form sorting system 1 may not include the conveyance device 20. For example, the robot 10 may place a form on the sorting mechanism 40. The form sorting system 1 may not include the sorting mechanism 40. The robot 10 may sort forms by type under the control of the control unit 104. For example, the robot 10 may sort the lifted forms into a plurality of boxes for each type.

Modifications

The above example embodiments can be variously modified. Hereinafter, modifications will be described.

The acquisition unit 101 may acquire images captured from a plurality of directions with respect to an image obtained by photographing a lifted form from a direction intersecting a lifting direction. Images from a plurality of directions may be captured by using a plurality of cameras 30 installed at positions where forms are lifted. The camera 30 may capture a plurality of images while the robot 10 rotates a form being lifted. Alternatively, images from a plurality of directions may be captured by a single camera 30 moving around a form.

The determination unit 102 may determine whether a form is bundled based on a plurality of images captured from a plurality of directions intersecting a direction in which the form is lifted.

The determination unit 102 determines whether a form is bundled based on a plurality of images captured from a plurality of directions, whereby it is possible to determine whether the form is bundled even in a case where it is difficult to determine from one direction.

Figure 9:
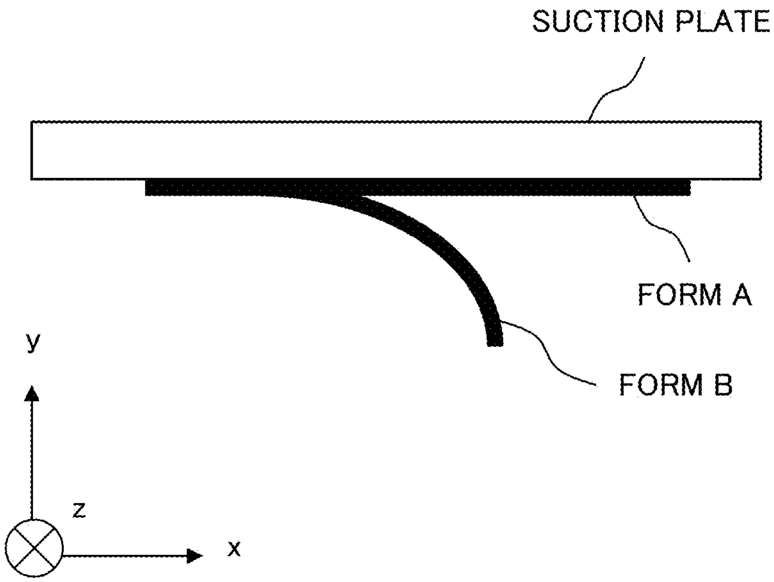
FIG. 9 is a diagram illustrating a situation in which a lifted form is viewed from one direction.
Figure 10:
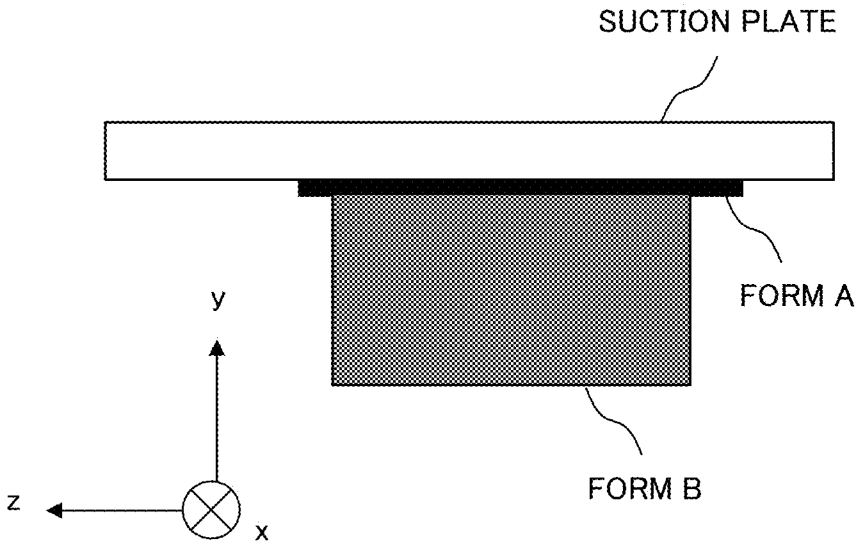
FIG. 10 is a diagram illustrating a situation in which a lifted form is viewed from another direction.

For example, in a case where a lifted form is photographed from a direction intersecting a lifting direction, only an edge of the form being hanged may be photographed, and the paper surface may not be photographed. FIG. 9 is a diagram illustrating a situation in which a lifted form is viewed from one direction. In a case where an image is captured from the direction of FIG. 9, if the form has a small thickness, it is difficult to determine whether the form hangs down from the image. However, by using an image captured from another direction different from the direction of the position described above, it is possible to determine a hanging part of the form. FIG. 10 is a diagram illustrating a situation of the form of FIG. 9 as viewed from another direction. When recognizing the hanging form B based on the image captured from the direction of FIG. 10, the determination unit 102 determines that a form is bundled.

In a case where the resolution of the image is sufficient, the determination unit 102 may determine whether a form is bundled even if the form is not hanged. For example, even when two or more forms overlap, the determination unit 102 may determine whether a form is bundled by recognizing whether the thickness of the lifted form is equal to or larger than the thickness relevant to the two forms based on the image. The determination unit 102 may determine that a form is bundled in a case where there is a gap between suction surfaces of the robot and the form.

[Hardware Configuration]

In the above-described example embodiment, each component of the form processing system 100 represents a block of functional units. A part or all of each component of the form processing system 100 may be achieved by any combination of the computer 500 and the program.

Figure 11:
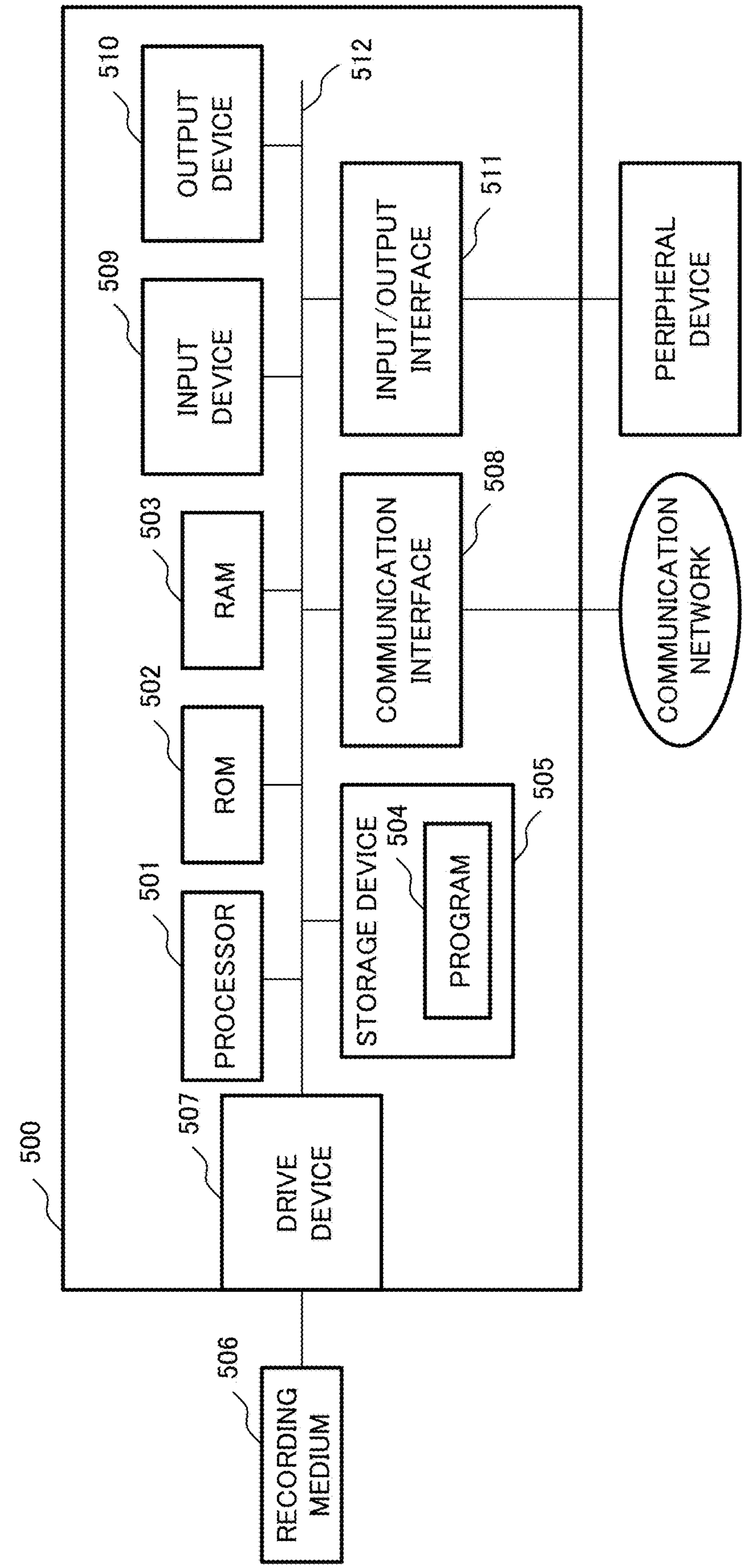
FIG. 11 is a block diagram illustrating an example of a hardware configuration of a computer 500.

FIG. 11 is a block diagram illustrating an exemplary hardware configuration of the computer 500. Referring to FIG. 11, the computer 500 includes, for example, a processor 501, a read only memory (ROM) 502, a random access memory (RAM) 503, a program 504, a storage device 505, a drive device 507, a communication interface 508, an input device 509, an input/output interface 511, and a bus 512.

The processor 501 controls the entire computer 500. Examples of the processor 501 include a central processing unit (CPU) and the like. The number of processors 501 is not particularly limited, and the number of processors 501 is one or more.

The program 504 includes an instruction for achieving each function of the form processing system 100. The program 504 is stored in advance in the ROM 502, the RAM 503, and the storage device 505. For example, the processor 501 of the form processing system 100 executes instructions included in the program 504 to implement the functions of the form processing system 100. The RAM 503 may store data to be processed in each function of the form processing system 100.

The drive device 507 reads and writes a recording medium 506. The communication interface 508 provides an interface with a communication network. The input device 509 is, for example, a mouse, a keyboard, or the like, and receives an input of information from the administrator. The output device 510 is, for example, a display, and outputs (displays) information to an administrator or the like. The input/output interface 511 provides an interface with a peripheral device. The bus 512 connects the components of the hardware. The program 504 may be supplied to the processor 501 via the communication network, or may be stored in advance in the recording medium 506, and the drive device 507 may read the program and supply the program to the processor 501.

The hardware configuration illustrated in FIG. 11 is an example, and other components may be added or some components may not be included.

There are various modifications of the implementation method of the form processing system 100. For example, the form processing system 100 may be achieved by an arbitrary combination of a computer and a program different for each component. A plurality of components included in the form processing system 100 may be achieved by any combination of one computer and a program.

Although the present disclosure has been particularly shown and described with reference to the present example embodiment, the present disclosure is not limited to the above example embodiment. It will be understood by those of ordinary skill in the art that various changes in form and details may be made therein without departing from the spirit and scope of the present disclosure as defined by the claims. The configurations in the example embodiments can be combined with each other without departing from the scope of the present disclosure.

REFERENCE SIGNS LIST

100 form processing system
101 acquisition unit
102 determination unit
103 recognition unit
104 control unit
1 form sorting system

20 conveyance device

30, 31 camera

40 sorting mechanism

What is claimed is:

1. A form processing system comprising:

at least one memory configured to store instructions; and at least one processor configured to execute the instructions to:

recognize a placed form, wherein the placed form is at least one of a substitute storage sheet, a slip, a gift certificate, or a receipt, each collected from a retail store;

control, based on a recognition result, an operation of a robot that lifts the placed form and advances the form to sorting processing one sheet at a time, wherein the sorting processing automatically distributes each sheet of forms to different sorting destinations according to a type of the forms;

acquire an image of a form lifted by the robot, the image being captured from a direction intersecting a lifting direction;

determine whether the lifted form is bundled based on the image; and in a case where it is determined that the form is bundled, control the robot in such a way to stop the operation of advancing the form to the sorting processing.

2. The form processing system according to claim 1, wherein the at least one processor is further configured to execute the instructions to determine whether the form is bundled by recognizing the form being hanged based on the image.

3. The form processing system according to claim 1, wherein the at least one processor is further configured to execute the instructions to:

determine whether a form is bundled based on a plurality of the images captured from a plurality of directions intersecting a lifting direction.

4. The form processing system according to claim 1, wherein the robot sucks and lifts the form.

5. The form processing system according to claim 1, wherein the operation is an operation of placing the form on a conveyance device that conveys forms to a sorting mechanism.

6. The form processing system according to claim 1, wherein the at least one processor is further configured to execute the instructions to:

determine whether the form is bundled by recognizing whether a fastener is fastened to the form based on an image obtained by photographing the placed form.

7. The form processing system according to claim 1, wherein the at least one processor is further configured to execute the instructions to:

control the robot in such a way to place a bundle of the forms in an error form storage.

8. A form processing method comprising:

recognizing a placed form, wherein the placed form is at least one of a substitute storage sheet, a slip, a gift certificate, or a receipt, each collected from a retail store;

controlling, based on a recognition result, an operation of a robot that lifts the placed form and advances the form to sorting processing one sheet at a time, wherein the sorting processing automatically distributes each sheet of forms to different sorting destinations according to a type of the forms;

acquiring an image of a form lifted by the robot, the image being captured from a direction intersecting a lifting direction;

determining whether the lifted form is bundled based on the image; and in a case where it is determined that the form is bundled, controlling the robot in such a way to stop the operation of advancing the form to the sorting processing.

9. A non-transient recording medium that records a program for causing a computer to execute:

recognizing a placed form, wherein the placed form is at least one of a substitute storage sheet, a slip, a gift certificate, or a receipt, each collected from a retail store;

controlling, based on a recognition result, an operation of a robot that lifts the placed form and advances the form to sorting processing one sheet at a time, wherein the sorting processing automatically distributes each sheet of forms to different sorting destinations according to a type of the forms;

acquiring an image of a form lifted by the robot, the image being captured from a direction intersecting a lifting direction;

determining whether the lifted form is bundled based on the image; and in a case where it is determined that the form is bundled, controlling the robot in such a way to stop the operation of advancing the form to the sorting processing.

10. The form processing system according to claim 1, wherein the at least one processor is further configured to execute the instructions to:

sort the forms according to content types including at least one of substitute storage sheets, slips, gift certificates, and receipts.

11. The form processing system according to claim 1, wherein the at least one processor is further configured to execute the instructions to:

sort the forms based on whether data of the forms need to be input.

12. The form processing system according to claim 1, wherein the at least one processor is further configured to execute the instructions to:

sort the forms based on whether the forms need to be stored.

13. The form processing system according to claim 1, wherein the at least one processor is further configured to execute the instructions to:

sort the forms based on whether the forms need to be returned to a store.

14. The form processing system according to claim 6, wherein the at least one processor is further configured to execute the instructions to:

determine whether the form is bundled by:

first determining whether a fastener is fastened to the placed form based on an image obtained by photographing the placed form; and in a case where the fastener is not detected, second determining whether the lifted form is bundled by recognizing the form being hanged based on the image of the form lifted by the robot.

* * * * *